(12) United States Patent
Farwaha et al.

(10) Patent No.: US 7,320,831 B2
(45) Date of Patent: Jan. 22, 2008

(54) SALT-SENSITIVE VINYL ACETATE BINDER COMPOSITIONS AND FIBROUS ARTICLE INCORPORATING SAME

(75) Inventors: Rajeev Farwaha, Belle Mead, NJ (US); Steven P. Pauls, Sr., Old Bridge, NJ (US); Pavneet S. Mumick, Belle Mead, NJ (US)

(73) Assignee: Celanese International Corporation, Dallas, TX (US)

( * ) Notice: Subject to any disclaimer, the term of this patent is extended or adjusted under 35 U.S.C. 154(b) by 217 days.

(21) Appl. No.: 11/120,372

(22) Filed: May 3, 2005

(65) Prior Publication Data

US 2006/0252876 A1    Nov. 9, 2006

(51) Int. Cl.
*C08K 3/26* (2006.01)
(52) U.S. Cl. .................. 428/507; 428/511; 428/522
(58) Field of Classification Search ................ 428/507, 428/511, 522
See application file for complete search history.

(56) References Cited

U.S. PATENT DOCUMENTS

| | | | |
|---|---|---|---|
| 3,035,004 A | 5/1962 | Glavis | 260/29.7 |
| 2,726,230 A | 12/1965 | Carlson | 260/86.1 |
| 3,248,356 A | 4/1966 | Snyder | 260/29.6 |
| 3,649,581 A | 3/1972 | Mast et al. | 260/29.6 |
| 3,677,991 A | 7/1972 | Moore | 260/29.6 |
| 3,810,977 A | 5/1974 | Levin et al. | 424/47 |
| 3,939,836 A | 2/1976 | Tunc | 128/284 |
| 4,005,251 A | 1/1977 | Tunc | 536/59 |
| 4,110,291 A | 8/1978 | Barabas et al. | 260/29.6 |
| 4,151,143 A | 4/1979 | Blank et al. | 260/29.6 |
| 4,242,408 A | 12/1980 | Evani et al. | 428/290 |
| 4,278,727 A | 7/1981 | Brabetz et al. | 428/290 |
| 4,309,469 A | 1/1982 | Varona | 428/74 |
| 4,384,096 A | 5/1983 | Sonnabend | 526/313 |
| 4,549,002 A | 10/1985 | Hoefer et al. | 526/209 |
| 4,603,176 A | 7/1986 | Bjorkquist et al. | 525/329.4 |
| 4,769,167 A | 9/1988 | Haas et al. | 252/76 |
| 4,801,671 A | 1/1989 | Shay et al. | 526/514 |
| 5,073,591 A | 12/1991 | Tsaur | 524/460 |
| 5,082,896 A | 1/1992 | Chan | 524/823 |
| 5,252,332 A | 10/1993 | Goldstein | 424/402 |
| 5,312,883 A | 5/1994 | Komatsu et al. | 526/318.44 |
| 5,317,063 A | 5/1994 | Komatsu et al. | 525/330.2 |
| 5,332,854 A | 7/1994 | Yokota et al. | 558/33 |
| 5,384,189 A | 1/1995 | Kuroda et al. | 428/288 |
| 5,500,281 A | 3/1996 | Srinivasan et al. | 428/288 |
| 5,509,913 A | 4/1996 | Yeo | 604/364 |
| 5,631,317 A | 5/1997 | Komatsu et al. | 524/561 |
| 5,656,746 A | 8/1997 | Smith et al. | 536/63 |
| 5,935,880 A | 8/1999 | Wang et al. | 442/65 |
| 5,972,805 A | 10/1999 | Pomplun et al. | 442/59 |
| 5,986,004 A | 11/1999 | Pomplun et al. | 525/176 |
| 6,043,317 A | 3/2000 | Mumick et al. | 525/176 |
| 6,063,857 A | 5/2000 | Greenblatt et al. | 524/561 |
| 6,194,517 B1 | 2/2001 | Pomplun et al. | 525/176 |
| 6,423,804 B1 | 7/2002 | Chang et al. | 526/319 |
| 6,433,245 B1 | 8/2002 | Bjorkquist et al. | 604/364 |
| 6,537,663 B1 | 3/2003 | Chang et al. | 428/394 |
| 6,548,592 B1 | 4/2003 | Lang et al. | 524/401 |
| 6,579,570 B1 | 6/2003 | Lang et al. | 427/421 |
| 6,599,848 B1 | 7/2003 | Chen et al. | 442/59 |
| 6,602,955 B2 | 8/2003 | Soerens et al. | 525/91 |
| 6,630,558 B2 | 10/2003 | Chang et al. | 526/319 |
| 6,653,406 B1 | 11/2003 | Soerens et al. | 525/212 |
| 6,683,143 B1 | 1/2004 | Mumick et al. | 526/240 |
| 6,713,414 B1 | 3/2004 | Pomplun et al. | 442/327 |
| 6,734,244 B2 * | 5/2004 | Confalone et al. | 524/425 |
| 6,762,239 B1 | 7/2004 | Williams | 524/547 |
| 6,815,502 B1 | 11/2004 | Lang et al. | 525/191 |
| 6,835,678 B2 | 12/2004 | Jackson et al. | 442/154 |
| 2002/0155281 A1 | 10/2002 | Lang et al. | 428/337 |
| 2003/0008591 A1 | 1/2003 | Parsons et al. | 442/414 |
| 2003/0032352 A1 | 2/2003 | Chang et al. | 442/102 |
| 2003/0096910 A1 | 5/2003 | Soerens et al. | 525/191 |
| 2003/0164476 A1 | 9/2003 | Guo et al. | 252/543 |
| 2003/0220042 A1 | 11/2003 | Lostocoo et al. | 442/543 |
| 2004/0018952 A1 | 1/2004 | Gray et al. | 510/543 |
| 2004/0030034 A1 | 2/2004 | Chang et al. | 524/543 |
| 2004/0030080 A1 | 2/2004 | Chang et al. | 526/318.44 |

(Continued)

FOREIGN PATENT DOCUMENTS

EP    0 327 376 A2    8/1989

(Continued)

OTHER PUBLICATIONS

U.S. Appl. No. 11/339,216, filed Jan. 25, 2006.

(Continued)

*Primary Examiner*—Robert D. Harlan
(74) *Attorney, Agent, or Firm*—Michael W. Ferrell

(57) ABSTRACT

A salt sensitive polymeric binder for use in fibrous webs, where the binder contains a copolymer incorporating the residue of vinyl acetate, a carboxylic acid, and a vinyl ester of a saturated aliphatic monocarboxylic acid having between 6 and 18 carbon atoms in the carboxylic acid moiety. The copolymer is neutralized at least to the extent that it is water soluble. The binders are particularly suitable for strengthening non-woven fibrous webs in disposable articles such as wet-wipes, personal care products, diapers, and the like.

40 Claims, No Drawings

U.S. PATENT DOCUMENTS

| | | | |
|---|---|---|---|
| 2004/0034138 A1 | 2/2004 | Buscall et al. | 524/377 |
| 2004/0055704 A1 | 3/2004 | Bunyard et al. | 156/305 |
| 2004/0058600 A1 | 3/2004 | Bunyard et al. | 442/59 |
| 2004/0058606 A1 | 3/2004 | Branham et al. | 442/327 |
| 2004/0062791 A1 | 4/2004 | Branham et al. | 424/443 |
| 2004/0063888 A1 | 4/2004 | Bunyard et al. | 526/310 |
| 2004/0110891 A1 | 6/2004 | Guo et al. | 524/522 |
| 2004/0151886 A1 | 8/2004 | Bobsein et al. | 428/211.1 |
| 2004/0186222 A1 | 9/2004 | Eknoian | 524/556 |
| 2004/0198114 A1 | 10/2004 | Barnhotz et al. | 442/1 |

FOREIGN PATENT DOCUMENTS

| | | |
|---|---|---|
| EP | 0 582 123 A1 | 2/1994 |
| EP | 0 608 460 A1 | 8/1994 |
| EP | 1 034 331 B1 | 9/2000 |
| EP | 1 093 478 B1 | 4/2001 |
| EP | 1 454 930 A2 | 9/2004 |
| FR | 2052199 | 4/1971 |
| GB | 1 307 729 | 2/1973 |
| GB | 1 451 619 | 10/1976 |
| WO | WO 99/27186 A1 | 6/1999 |
| WO | WO 99/65958 A1 | 12/1999 |
| WO | WO 00/38750 A1 | 7/2000 |
| WO | WO 00/39378 A2 | 7/2000 |
| WO | WO 01/83666 A2 | 11/2001 |
| WO | WO 01/83866 A2 | 11/2001 |
| WO | WO 02/077048 A2 | 10/2002 |
| WO | WO 03/005874 A1 | 1/2003 |
| WO | WO 03/022318 A1 | 3/2003 |
| WO | WO 03/099886 A1 | 12/2003 |

OTHER PUBLICATIONS

U.S. Appl. No. 11/120,381, filed May 3, 2005.
U.S. Appl. No. 10/761,682, filed Jan. 21, 2004.
U.S. Appl. No. 09/883,520, filed Jun. 18, 2001.
U.S. Appl. No. 09/564,531, filed May 4, 2000, Lang et al.

* cited by examiner

SALT-SENSITIVE VINYL ACETATE BINDER COMPOSITIONS AND FIBROUS ARTICLE INCORPORATING SAME

TECHNICAL FIELD

The present invention relates generally to disposable fibrous articles containing a water-dispersible binder, and particularly to articles containing vinyl acetate binders with dispersibility that is responsive to salt concentration.

BACKGROUND

Wet strength is a desirable attribute of many disposable paper products that are required to maintain their wet integrity for an extended period of time prior to and during their intended use. Such products include toilet tissue, diapers, personal care products, and pre-moistened articles such as baby wipes and household cleaning wipes.

Permanent wet strength, however, is often an unnecessary and undesirable characteristic in paper products. Due to the permanent wet strength of such products, paper products are generally disposed of after brief periods of use into landfills, incinerators, etc. and thus can pose a significant burden on the solid waste stream. It is therefore preferable to direct used paper products to municipal sewage treatment facilities or private septic systems. Unfortunately, this procedure is often not possible if the product is "unflushable." Clogging of sewage and septic systems can result if the product permanently retains hydrolysis-resistant strength properties. To address this problem, efforts have been undertaken to provide binders that will provide paper products with sufficient "temporary" wet integrity in the presence of saline solutions, but minimal integrity when exposed to large amounts of waste water, such that they traverse plumbing and disintegrate in sewage and/or septic systems.

Specifically, it has been attempted to produce disposable fibrous products which maintain a relatively high wet strength in the presence of solutions with elevated ion concentrations, but become more dispersible when in contact with solutions having a lower ion concentration. These ion-sensitive, water dispersible polymer formulations are well known in the art. There is disclosed for example, in U.S. Pat. No. 6,429,261 to Lang et al. a polymer formulation comprising a triggerable copolymer of acrylic acid, NaAMPS, butyl acrylate and 2-ethylhexyl acrylate as well as a non-crosslinkable co-binder polymer comprising poly (ethylene-vinyl acetate), wherein the polymer formulation is insoluble in a neutral salt solution containing at least about 1 weight percent salt and wherein the triggerable copolymer is soluble in water containing up to about 200 ppm of one or more multivalent ions.

U.S. Pat. No. 6,291,372 of Mumick et al. discloses ion sensitive binders for fibrous material. A water soluble polymer binder for binding a fibrous substrate includes about 25 to about 85 weight percent of unsaturated carboxylic acid and ester terpolymer; as well as from about 5 weight percent to about 35 weight percent of a divalent ion inhibitor and from about 10 weight percent to about 60 weight percent of a hydrophilic cross-linkable polymer. The polymer binder is useful for binding absorbent webs of the class used in personal care products such as pre-moistened wipes.

U.S. Pat. No. 5,631,317 to Komatsu et al. discloses a process for producing self-dispersing and salt-sensitive polymer. The formulations include from a) about 35 to about 65 weight percent of acrylic acid; b) from about 10 to about 45 weight percent of an acrylic ester such as 2-ethylhexyl (meth)acrylate or lauryl(meth)acrylate; and c) from about 20 to about 45 weight percent of a second acrylic ester such as ethyl (meth) acrylate, isopropyl(meth)acrylate, or n-butyl (meth)acrylate.

U.S. Pat. No. 4,278,727 to Brabetz et al. discloses a binder emulsion for non-woven materials that comprises protective colloids, optional emulsifiers, and a copolymer that incorporates monomers of vinyl acetate, a vinyl ester of higher alkanoic acid and/or higher alkyl esters of acrylic or methacrylic acids, and an ethylenically-unsaturated acid. The binder formulations in Brabetz, however, are reported to be relatively water resistant, but soluble in basic solutions. The binders impart a relatively high wet strength to fiber when soaked in water and do not appear to be salt-sensitive.

Still further references of interest with respect to salt sensitive binders include the following: U.S. Pat. No. 6,683,129 to Eknoian which discloses salt sensitive binders in aqueous emulsions; U.S. Pat. No. 5,312,883 to Komatsu et al. which discloses water soluble salt sensitive polymers; and U.S. Pat. No. 6,127,593 to Bjorkquist et al. for flushable fibrous structures.

While salt sensitive binders are known, there exists a need for salt sensitive binders which are readily produced from available low-cost monomers and which form stable solutions that are easy to apply during web manufacture.

SUMMARY OF INVENTION

There is provided in accordance with the present invention a binder solution for a fibrous web, where the solution comprises an aqueous solvent medium and a binder composition which comprises a salt sensitive copolymer. The copolymer incorporates the residue of from about 60 to 90 wt. % vinyl acetate, from about 2 to about 20 wt. % of a carboxylic acid monomer and from about 5 to about 30 percent of vinyl ester units having the following formula:

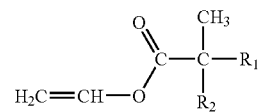

where $R_1$ and $R_2$ together have between 3-14 carbons atoms, and where the copolymer is neutralized with base at least to the point where it is water soluble. The binder composition has a characteristic wet strength of at least about 75 gf/in in a 10% NaCl solution, and a characteristic wet strength of less than 50 gf/in in deionized water.

The carboxylic acid monomer of the salt sensitive polymer is typically one of the following: crotonic acid, acrylic acid, maleic acid, and a mono-alkyl maleate. Crotonic acid is the preferred carboxylic acid monomer. Generally, the $R_1$ and $R_2$ groups on the vinyl ester, together contain between 6-9 carbon atoms, preferably 7. Desirably either or both of $R_1$ and $R_2$ is a branched alkyl group.

Typically, the binder solution contains between 5 and 25 wt. % binder composition, where the binder composition usually contains between 50 and 100% of the salt sensitive copolymer. In preferred embodiments the aqueous solvent medium consists essentially of water. The phrase "consists essentially of water" means that the solution comprises at least 80% water, as it is a basic and novel characteristic of this invention that the binder solution is essentially processable as an aqueous solution.

There is also provided a method of producing a disposable fibrous web comprising the steps of preparing the copolymer, neutralizing it such that it is water soluble, dissolving the polymer into an aqueous solution, and applying the solution to the web. The solution may be applied to the fibrous web by means such as spraying, coating, or dipping. Preferably the fibrous web is also subjected to a drying step and has an add-on value from 15 to about 30 percent. The fibrous web is usually contacted with a solution of inorganic salt. This may include a lotion containing at least 0.5 wt. % of an inorganic salt.

Yet another aspect of the present invention is a disposable article which comprises a fibrous web with a salt sensitive binder composition. The binder composition includes a copolymer that incorporates the residue of from about 60 to about 90 percent of vinyl acetate, from about 2 to about 20 percent of a carboxylic acid, and from about 5 to about 30 percent of the vinyl ester monomer. Here again, the copolymer is neutralized at least to the point where it can be characterized as being fully soluble in deionized water at room temperature. The binder composition has a characteristic wet strength in an aqueous solution of 10 wt. % NaCl of at least about 75 gf/in, and preferably at least about 100 gf/in. The binder composition also has a characteristic wet strength in deionized water of less than 50 gf/in, preferably less than 40 gf/in.

Suitable amounts of carboxylic acid units in the copolymer range from about 5 to about 15 wt. %, and preferably is about 10 wt. %. Generally the carboxylic acid monomer is crotonic acid. Either or both of the $R_1$ and $R_2$ groups on the vinyl ester may be a branched alkyl group. The binder composition may further include additives such as plasticizers, tackifiers, thickeners, fillers, humectants, surfactants, fragrances, pigments, titanium dioxide, colorants, antifoams, bactericides, and bacteriostats. The binder composition should desirably contain from about 50 to about 100 wt. % of the copolymer.

The fibrous webs of the present invention may be contacted with an organic salt, preferably in the form of a solution containing at least about 0.5 wt. % of an inorganic salt. Also, the web may contain a lotion which has a salt content of at least about 0.5 wt. %.

The binder is applied to the fibrous web such that the web generally has an add-on value of from about 5 to about 30 percent, and preferably from about 10 to about 20 percent.

Suitably, the inventive fibrous webs are non-woven webs such as air-laid non-wovens or wet-laid non-wovens. The webs may comprise cellulosic fiber such as kraft fiber, and may also comprise synthetic fibers such as polyester, polypropylene, or rayon fibers. Preferably, the inventive disposable article is a wet wipe, a diaper, an incontinent garment, or a feminine care product.

Further features and advantages of the present invention will become apparent from the discussion that follows.

DETAILED DESCRIPTION

The present invention is described in detail below with reference to the various examples. Modifications to particular examples within the spirit and scope of the present invention, as set forth in the appended claims, will be readily apparent to those of skill in the art.

Unless otherwise indicated, terms are to be construed in accordance with their ordinary meaning. Following are some exemplary definitions of terms used in this specification and the appended claims.

As used herein, "%" or "percent," refers to weight percent unless indicated otherwise.

"Non-woven," "non-woven web," and like terminology, refers to materials formed from loosely assembled fibers, which are bound together, in part, by a polymer binder. The binder plays an important role in the material properties, such as strength of the non-woven material.

"Wet strength" and like terminology, as used herein, refers to the tensile strength of a fibrous web when completely wetted.

"Characteristic wet strength" as used in reference to the binder, refers to the wet strength that the binder would exhibit if applied to a standard web, subjected to standard conditions, and soaked in a specified solution. For the purposes of this invention, the characteristic wet strength is a property of the binder which is measured as set forth in the Examples below. Accordingly, the characteristic wet strength of the binder is determined as the normalized cross-direction tensile strength of a sample cut from Whatman No. 4 filter paper which has an add-on of about 14% of the binder, and has been soaked for 60 minutes in the prescribed solution. The tensile strength is normalized to a basis weight of 112.5 gsm. The wet tensile strength as used herein is measured by the TAPPI UM 656 procedure, consistent with the tests in the Examples illustrated below.

"Water soluble" when used in reference to a neutralized copolymer, is defined as the characteristic of being fully soluble in deionized water at room temperature, i.e., 23° C. The copolymer is fully soluble at the point where no polymer particles are visible and the solution is as translucent as possible. The phrase "neutralized at least to the point where the polymer is water soluble" refers to the minimum extent of neutralization required to make the copolymer water soluble. Optionally, the copolymers may be neutralized in excess of that point by contacting the polymer with additional base.

The binders employed in the present invention are dispersible in solutions with a low ion concentration and non-dispersible in solutions containing higher ion concentrations, such as aqueous solutions having a salt content of about 0.5 wt. % or higher. The fibrous web exhibits similar dispersibility behavior when provided with the binder. The dispersiblity of either the binder or the web is inversely proportional to the wet strength, i.e., high wet strengths correspond to a low dispersibility.

The binder solutions made according to the present invention comprise an aqueous solvent medium and a binder composition which includes a copolymer. Preferably, the aqueous solvent consists essentially of water. In some embodiments, the copolymer of the binder comprises the residue of from about 60 to about 90 wt. % vinyl acetate, from about 2 to about 20 wt. % of carboxylic acid, and from about 5 to about 30 wt. % of a vinyl ester of an saturated aliphatic monocarboxylic acid having from 6 to 18 carbon atoms in the carboxylic acid moiety. In preferred embodiments the copolymer includes between 70-85 weight percent of vinyl acetate units, between 5-15 weight percent of crotonic acid units, and between 10-20 weight percent of the vinyl ester units.

The carboxylic acid monomer includes acids such as crotonic acid, acrylic acid, maleic acid, mono-alkyl-maleates, and the like. Preferably the carboxylic acid monomer is crotonic acid. Crotonic acid has the following structure:

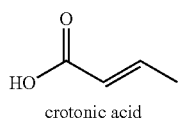
crotonic acid

The vinyl ester monomers are esters of an saturated aliphatic monocarboxylic acid having between 6 to 18 carbon atoms in the carboxylic acid moiety. The carboxylic acid has the following formula:

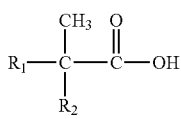

wherein $R_1$ and $R_2$ are alkyl radicals. Preferably, at least one of the groups emanating from the carbon atom that is adjacent to the carboxyl group, i.e. $R_1$ or $R_2$, is a branched alkyl group. Suitable aliphatic monocarboxylic acids of this type include 2,2,4,4,-tetramethyl valeric acid, which has the following structure:

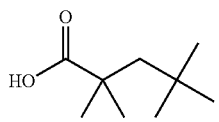

Another suitable aliphatic monocarboxylic acid is 2-isopropyl-2,3,-dimethyl butyric acid, which has the following structure:

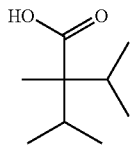

Other suitable monocarboxylic acids to be used in the vinyl esters include Versatic acid. The vinyl esters thus have the following general structure:

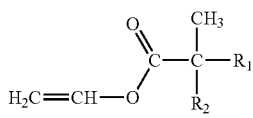

where $R_1$ and $R_2$ represent the same groups as in the above described formula. $R_1$ and $R_2$ together have between 3-15 carbon atoms, and preferably between 6 and 9 carbon atoms. Especially preferred vinyl esters include VeoVa™ 9 and VeoVa™ 10 available from Resolution Performance Products, LLC (Houston, Tex.). In VeoVa™ 9, $R_1$ and $R_2$ together contain 6 carbon atoms. In VeoVa™ 10, $R_1$ and $R_2$ together contain 7 carbon atoms.

The copolymers employed in the present invention may be prepared in accordance with the disclosure of U.S. Pat. No. 3,810,977. The copolymers may be manufactured by conventional polymerization methods, for example, in bulk, in solution, in suspension, or in emulsion. The polymers are preferably made in suspension. Polymerization may be initiated by a free-radical-forming initiator or polymerization catalyst, which may be either water soluble or monomer-soluble, depending on the type of polymerization. Suitable free-radical-forming initiators are those that are suitable for initiating the homopolymerization of vinyl acetate, and especially peroxy compounds, such as diacyl peroxides, e.g., diacetyl peroxide, dilauroyl peroxide, and dibenzoyl peroxide; per esters, such as peresters of branched alcohols with linear or branched fatty acids, e.g., tert.-butyl peroctoate, tert.-butyl perpivalate, and tert.-butyl perisononoate; di-tert.-butyl peroxide; dialkyl peroxydicarbonates; and water-soluble peroxy compounds, e.g., hydrogen peroxide, sodium persulfate, potassium persulfate, ammonium persulfate, and tert.-butyl hydroperoxide.

When using a monomer-soluble peroxy compound, it can be advantageous additionally to use 2,2-bis(tert.-butylperoxy)-butane. Mixtures of two or more peroxy compounds may be used. These peroxy compounds may, optionally, be used together with reducing agents in a redox system. Suitable reducing agents are, for example, sodium formaldehyde sulfoxylate, iron-II salts, sodium dithionite, sodium bisulfite, sodium sulfite, sodium thiosulfate, and a palladium sol with hydrogen.

The copolymers employed in the present invention are neutralized with base at least to the point where they are water soluble, as the term is defined above. Typically, the copolymers are neutralized by dispersing them in an aqueous medium and adding a basic solution until they become water soluble. Also, the polymers may be neutralized with an amount of base that is determined stoichiometrically from the amount of acid in the polymer, so long as the polymer is water soluble. Suitable bases include NaOH, KOH, $Na_2CO_3$, $NaHCO_3$, and the like. Preferably, the base should be non-volatile and should not contain divalent cations. The polymers usually become fully soluble when the solution reaches a pH of between 7 and 8, generally at about 7.5. It should be understood, however, that the minimum degree of neutralization required for the polymers to exhibit full solubility will vary depending on the composition of the polymer.

The binder formulation may also include other additives as dictated by the nature of the desired composition as well known by those of ordinary skill in the art. Examples of additives traditionally used include plasticizers, surfactants, tackifiers, thickeners, fillers, humectants, fragrances, pigments, titanium dioxide, colorants, antifoams, bactericides, bacteriostats, and encapsulated components which may be employed in conventional amounts.

Surfactants are often employed in adhesive or binder compositions as wetting agents. The surfactants may be one or more of anionic, cationic, amphoteric or nonionic surface-active compounds. Suitable anionic surfactants are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic surfactants are, for example, alkyl quaternary ammonium salts, and alkyl quaternary phosphonium salts. One type of suitable nonionic surfactant is the addition product of 5 to 50 moles of ethylene oxide adducted to straight-chain and branched-chain alkanols with 6 to 22 carbon atoms, or to alkylphenols, higher fatty acids, higher fatty acid amines, or primary and secondary higher alkyl amines. Other suitable non-ionic surfactants are one or more block copolymers of propylene oxide with ethylene oxide. Preferred surfactants include fluorinated alkyl amphoterics or sodium dioctylsulfosuccinate. The surfactant may comprise from about 0.05 to about 5 weight percent of the total solids weight.

Illustrative examples of plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid. Of these plasticizers, dibenzoate types, phthalates, liquid polyesters or sulfonated types are preferred. When present, plasticizers are generally used in amounts of 2 to 20 parts by weight, preferably 3 to 15 parts.

Illustrative examples of tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamide-formaldehyde resin, and wood rosin. When present, tackifiers are generally used in dispersion form at 40% to 65% solids in amounts up to about 50 parts by weight, preferably 2 to 20 parts.

Illustrative examples of thickeners include associative thickeners such as hydrophobically modified ethoxylated polyurethanes and hydrophobically modified alkali soluble emulsions, as well as alkali soluble emulsions. Other thickeners include aliginates, bentonite, casein, fumed silica, guar gum, gum tragacanth, hydroxy-ethylcellulose, locust bean gum, methylcellulose, polyacrylic acid salts (ammonium, potassium, sodium), polyvinyl alcohol, sodium carboxymethyl cellulose, and starches. When present, thickeners will be used in amounts up to about 25 parts by weight.

Illustrative examples of fillers include bentonites, nut shell flours, silica, talc, uncooked starches, and wood flour. When present, fillers will be used in amounts up to about 20 parts by weight.

Illustrative examples of humectants include diethylene glycol, glycerine, hexylene glycol, propylene glycol, sorbitol, sucrose, and urea. When present, humectants will be used in amounts up to about 20 parts by weight.

Typically, the binder formulation is present in the solution in amounts from 2 to 60 wt. percent, preferably from 5 to 40 wt. percent and most preferably from 5 to 25 wt. percent. Water should be the primary component of the solvent, although other organic solvents may be present in lesser amounts. Water may be added to the binder formulation to adjust the solids level and viscosity required for application to the fiber web. The copolymer employed should comprise between about 25 to 100 weight percent, preferably 50 to 99.9 weight percent of the total solids weight. Optionally, a plasticizer may be included in the solution to aid in providing softness and flexibility to the bound fibrous structure.

The fibrous webs employed in the present invention are preferably non-woven webs. The non-woven structures of the present invention comprise the vinyl acetate binder in combination with fibers. The non-woven is formed by any process known in the art, such as, but not limited to, airlaid, wetlaid, drylaid, or carded fiber. The fiber web typically has a basis weight of from 20-200 grams per square meter (gsm). The fibers in the non-woven material may be oriented isotropically, or be aligned with respect to a processing direction. Thicker non-wovens may additionally have fiber oriented in the z-direction of the article, i.e. perpendicular to the fabric plane. In addition to a binder material, the fibers in the non-woven materials may be interlocked mechanically to provide strength and cohesion.

In the manufacture of non-woven webs, the fibers are typically dispersed in a medium (air for air-laid and liquid for wet-laid) and deposited in sheet form on a support base. In air-laid processes the fibers and other optional materials are typically suspended in air within a forming system and deposited as a sheet-like structure onto moving forming screen or a rotating cylinder, prior to application of the binder. Wet-laid processes include providing an aqueous slurry and drying the slurry to form the web.

Fibers from any source and of any suitable length may be used in the present invention. Fibers include those known in the art including cellulosic fibers from woody plants such as deciduous and coniferous trees; non-woody plants, such as cotton, flax, esparto grass, milkweed, straw, jute and bagasse; and synthetic fibers, such as those derived from polyester, polypropylene, polyethylene, polyamides, polyacrylics, and rayon. Other fiber materials used in the art, and mixtures of any fibers, can be used in the present invention. Preferred fibers are those typically used in non-wovens, especially wood pulp fibers having a length of less than 0.5 cm such as kraft fibers. For wet-laid webs, the fibers should generally be less than a maximum of 5 cm long and most preferably less than 2 cm long. For air-laid webs, the fibers should be less than 8 mm long, preferably less than 6 mm long. Such fibers provide good biodegradable breakdown and dispersion characteristics. Fibers are present in the web at from 50 to 98 percent by weight, depending on the end use of the disposable article. For many uses, fibers make up about 70 to 85 percent by weight of web.

Generally, the fiber web is formed or at least partially formed prior to application of binder solution. The polymer binder is combined with the fibers by contacting the fibers with an aqueous solution of the binder by means known in the art such as, printing, spraying with or without air, saturation, creping, and foam-application. The polymer may be combined with the fibers in the wet-end of the paper-making process (e.g., by addition to the paper furnish) or after the paper product is substantially formed (i.e., via dry end addition). After application, the fibrous web is typically subjected to a drying step to remove water and/or other liquid. Drying may be accomplished by subjecting the paper product to elevated temperatures, e.g., in the range of from about 85° C. to about 125° C. for a time sufficient to achieve the desired level of dryness, typically to constant weight.

The amount of binder composition that remains on the fibers is referred to as "add-on." The percent add-on can be calculated as follows:

$$\text{Add-on \%} = \frac{\text{Saturated fiber wt.} - \text{Unsaturated fiber wt.}}{\text{Saturated fiber wt.}} \times 100\%$$

The unsaturated fiber weight is the weight of the fibers before any binder composition is applied. The saturated fiber weight is the weight of the web after the binder has been applied, and the web is dried to remove substantially all of the water. The fibrous webs will generally have an add-on value of from 2 to 50 percent by weight, preferably from 15 to 30 percent by weight.

The binder obtains the temporary wet strength in the presence of salt. Depending on the application, it may be desirable to apply the salt to the fibrous web during production. In such cases, the salt may be applied to the article during manufacture by conventional means such a spraying, coating, dipping, etc. Generally, the polymer solution and salt should not be mixed together before they are added to the fibers. The reason for this is that the salt has a tendency to precipitate the polymer if the two are combined prior to addition to the fibers. Thus, the disposable article that is being treated with the polymer binder is preferably subjected to the drying step to remove water and/or any other liquid prior to the addition of salt. Upon drying, the salt component can be added to the fiber/binder substrate to develop the in-use strength. The salt is typically applied to the web in a solution containing at least about 0.5 wt. % salt to ensure that the web maintains its temporary wet strength. It is preferred to employ salts with monovalent cations such as NaCl, as opposed to salts having multivalent cations which tend to affect the dispersibility characteristics of the binder.

Pre-moistened products produced according to present invention, such as wet wipes, may contain a lotion. The lotion contains one or more additives, which include, but are not limited to, sodium chloride or sodium sulfate solution, preservatives, boric acid, bicarbonates, moisturizers, emollients, surfactants, humectants, alcohols, water, and fragrances. The lotion should contain at least 0.5 percent by weight of an inorganic salt to maintain the integrity of the binder. The lotion may be present at up to 500 percentage by weight based on the weight of the non-woven material, and preferably up to 350 percent. The lotion is generally added as a secondary treatment of the non-woven that has been prepared with the salt-sensitive binder and then converted for use. This wet solution treatment can occur just prior to packaging, or after the non-woven has been placed in the final container. Prepared in this manner, wet-use products will have a stable wet strength of measurable tensile value and integrity, yet disperse when placed in tap water, allowing the product to be flushed in sewer or septic systems without blockage. The fiber typically begins dispersing immediately in water. The rate of dispersion can be tailored for different applications by varying factors such as the composition of the polymer, the molecular weight, the degree of neutralization, or the pH of the solution.

The inventive binder solutions are particularly suitable for applications involving pre-moistened articles because the articles may be stored in a solution containing about 0.5 wt. % or more of salt, whereby the articles maintain a high wet strength until disposed. Pre-moistened articles include those such as wet wipes, pre-moistened baby wipes, pre-moistened toilet tissue, and pre-moistened household wipes. The inventive binder solutions may also be suitable for other disposable applications which employ salt sensitive binders such as diapers, incontinent garments, feminine care products, and the like.

The fibrous webs of the present invention should have binders which maintain some temporary wet strength while in the presence of aqueous solutions containing more than 0.5% salt, yet be relatively dispersible when in the presence of wastewater. The fibrous webs used in the disposable articles of the present invention are typically provided with a binder that has a characteristic wet strength of at least about 75 g/in in an aqueous solution of 10 wt. % NaCl, and preferably at least about 100 gf/in. In addition, the binders have a characteristic wet strength in deionized water of not more than about 50 g/in., and preferably not more than 40 g/in.

The following examples are presented to further illustrate and explain the present invention and should not be taken as limiting in any regard.

EXAMPLES

Two exemplary binder solutions and a comparative solution were applied to pulp substrates and tested for tensile strength after being wetted with three aqueous solutions having varying ion concentrations.

Table 1, below, shows the compositions, in weight percent, of Examples A and B and Comparative Example C, containing varying quantities of Vinyl acetate, VeoVa™ 10, and crotonic acid.

TABLE 1

| Binder Formulations | | | |
|---|---|---|---|
| Example | Vinyl Acetate | VeoVa 10 | Crotonic Acid |
| A | 75.5 | 14.5 | 10 |
| B | 76.3 | 13.5 | 10.2 |
| C | 90 | 0 | 10 |

The monomers are first polymerized and processed to obtain a polymeric powder composition. The solution polymer is then prepared at room temperature by neutralizing the polymer according to the following procedure: 100 g of polymer powder is added at 15% weight solids to deionized water. The polymer dispersion is agitated and a solution of 15% solids sodium hydroxide is added to the polymer dispersion until the polymer becomes fully soluble in the water, i.e. the point where no polymer particles are visible in the solution.

The procedure for preparing the saturated pulp substrate is as follows: A pulp substrate is dip-nip saturated with the solution polymer and then thermally dried and post-treated to simulate temperature conditions in commercial pulp manufacturing. Whatman #4 Qualitative Filter Paper sheets, commercially available from Whatman, Inc., are the pulp base stock and are stored under controlled temperature (23° C.) and humidity (50%) conditions before use. The pulp is cut to approximately 11.5×57 cm strips and weighed to 0.01 gm.

The solution polymer is diluted to the solids level needed to achieve an add-on of about 13-14%. The Whatman pulp is dip-nip saturated by passing the pulp through the solution polymer bath and then passing the saturated sheets through the pressurized nip rolls of a dual roller saturator (Werner Mathis VFM or a similar saturator) to squeeze off the excess polymer solution. The saturated sheet is then placed into a heated drum drier (Adirondack or a similar drier) set at 100° C. until dry to the touch (usually about 2-3 passes). After initial drying, the pulp is placed into an oven set at 130° C. for two minutes. The saturated, dried sheet is re-conditioned at controlled temperature and humidity conditions for a minimum of one hour. The sheet is reweighed to 0.01 gm and then calculated for % add-on.

The procedure for preparation of tensile strips and soak solutions is as follows: The saturated pulp is cut into 1×4 inch cross-machine tensile strips using a precision paper cutter (Test Machines, Inc. or similar cutter). The tensile strips are weighed and the weight is used to calculate basis weight in grams/square meter. Test solutions are prepared as follows:
   a) Solutions of 10% sodium chloride (NaCl) by weight in deionized water.
   b) A 200 ppm hard water solution using 134 ppm $Ca^{++}$ from calcium chloride ($CaCl_2$) and 66 ppm $Mg^{++}$ from magnesium chloride ($MgCl_2$) in deionized water.
   c) Standard deionized water.

Tensile testing and normalization is performed as follows: The test strips are soaked in the various solutions and then measured for wet strength. The solutions represent the type of environments which the pulp may be exposed to, e.g., salty conditions for in-use storage (10%) and various water conditions for disposal (200 ppm for hard water disposal and deionized for softer water disposal).

The raw tensile strength is normalized to a standard basis weight in order to marginalize the effects of variations in the fabric weight. First, a tensile tester (Instron 5542 or a similar tester) is set to the following parameters: a) pneumatic grips using 1×1 inch facings; b) a gap or 2 inches between the top and the bottom facings; c) a crosshead speed of 1 inch/minute; and d) a load cell capable of measuring up to 20,000 gm/inch. Tensile strips are soaked (4-6 strips per soak solution) for 60 minutes in the specified soak solution with an emphasis placed on ensuring that full wetting of the strips occurs. The level of soak solution used is as follows: a) 125 gm 10% NaCl salt solution per tensile group (4-6 strips); and b) 45 gm of hard water and deionized water per tensile strip soaked. Upon removal from the soak solution, the tensile strip is placed onto absorbent paper toweling to remove excess solution and then immediately tested for tensile strength. The average tensile strength (gram/inch) is then normalized and reported to a basis weight of 112.5 gsm using the following formula:

$$\text{Normalized Tensile Strength} = \frac{\text{Average Tensile Strength}(gf/in) \times 112.5 gsm}{\text{Actual Basis Wt.}(gsm)}$$

All tests results are reported at a normalized tensile strength of 112.5 gsm.

Table 2 illustrates the wet strength results in the three test solutions for each polymer formulation.

TABLE 2

| | | Composition Performance | | | |
|---|---|---|---|---|---|
| Example | Add-on (%) | BW (gsm) | 10% NaCl (gf/in) | 200 ppm (gf/in) | DI Water (gf/in) |
| A | 14.0 | 110.9 | 127 | 43 | 33 |
| B | 14.2 | 109.4 | 105 | 47 | 37 |
| C | 13.0 | 109.1 | 54 | 37 | 33 |

As can be seen from the above examples, the formulations employing the inventive binder solution achieve a wet-strength in a 10% salt solution that is about twice that of a binder which does not contain the vinyl ester of monocarboxilic acid. Also, the fibrous webs are relatively dispersibile in hard water and deionized water, with wet-strengths of less than 50 gf/in.

Many modifications and variations of this invention can be made without departing from its spirit and scope, as will be apparent to those skilled in the art. For example, increasing or decreasing the various monomer ratios can influence tensile performance, as can changing the level of neutralization. Other factors can also affect the dispersibility of a web such as the type of fibers, the structure of the substrate, and the amount of binder used. The specific embodiments described herein are offered by way of example only, and the invention is to be limited only by the terms of the appended claims, along with the full scope of equivalents to which such claims are entitled.

In view of the foregoing discussion, relevant knowledge in the art and references discussed above in connection with the Background and Detailed Description, the disclosures of which are all incorporated herein by reference, further description is deemed unnecessary.

What is claimed is:

1. A binder solution for a fibrous web, said solution comprising:
   (a) an aqueous solvent medium; and
   (b) a binder composition comprising a salt sensitive copolymer that incorporates the residue of:
      (i) from about 60 to about 90 weight percent of vinyl acetate;
      (ii) from about 2 to about 20 weight percent of a carboxylic acid monomer; and
      (iii) from about 5 to about 30 percent vinyl ester of the formula:

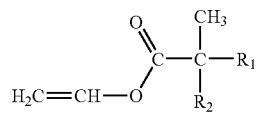

where $R_1$ and $R_2$ are alkyl groups collectively having between 3-14 carbon atoms, wherein said copolymer is neutralized with base at least to the point where it is water soluble, and wherein said binder composition has a characteristic wet strength of at least about 75 gf/in in a 10% NaCl solution, and a characteristic wet strength of less than 50 gf/in in deionized water.

2. The binder solution according to claim 1, wherein the carboxylic acid is selected from the group consisting of crotonic acid, acrylic acid, maleic acid, and a mono-alkyl-maleate.

3. The binder solution according to claim 2, wherein the carboxylic acid is crotonic acid.

4. The binder solution according to claim 1, wherein $R_1$ and $R_2$ together have between 6-9 carbon atoms.

5. The binder solution according to claim 1, wherein $R_1$ and $R_2$ together have 7 carbon atoms.

6. The binder solution according to claim 1, wherein either or both of $R_1$ and $R_2$ are branched alkyl groups.

7. The binder solution according to claim 1, wherein the solution comprises from about 5 to about 25 weight percent binder composition.

8. The binder solution according to claim 1, wherein the binder composition comprises from about 50 to about 100 weight percent of copolymer.

9. The binder solution according to claim 1, wherein the aqueous solvent medium consists essentially of water.

10. A method of producing a disposable fibrous web, said method comprising the steps of:
   (a) preparing a salt sensitive binder polymer by copolymerizing from about 60-90 weight percent vinyl acetate, from about 2-20 weight percent of a carboxylic acid monomer, and from about 5 to about 30 percent of a vinyl ester having the formula,

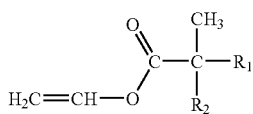

where $R_1$ and $R_2$ are alkyl groups collectively having between 3-14 carbon atoms;
  (b) neutralizing the polymer with base at least to the point where it is water soluble;
  (c) dissolving said binder polymer into an aqueous solution; and
  (d) applying said solution to the fibrous web,
wherein the binder has a characteristic wet strength of at least about 75 gf/in in an aqueous solution of 10 wt. % NaCl, and has less than 50 gf/in in deionized water.

11. The method according to claim 10, wherein the solution is applied to the fibrous web by spraying.

12. The method according to claim 10, wherein the solution is applied to the fibrous web by coating.

13. The method according to claim 10, wherein the solution is applied to the fibrous web by dipping.

14. The method according to claim 10, further comprising the step of drying the fibrous web.

15. The method according to claim 10, wherein the fibrous web has an add-on value of from about 15 to about 30 percent.

16. The method according to claim 14, further comprising the step of contacting the disposable fibrous web with a solution of inorganic salt.

17. The method according to claim 10 further comprising the step of adding a lotion to said fibrous web, wherein said lotion contains at least about 0.5 wt. % of an inorganic salt.

18. A disposable article comprising a fibrous web which is provided with a salt sensitive binder composition, wherein the binder composition includes a copolymer that incorporates the residue of:
  (a) from about 60 to about 90 weight percent of vinyl acetate;
  (b) from about 2 to about 20 weight percent of carboxylic acid; and
  (c) from about 5 to about 30 percent of a vinyl ester having the formula

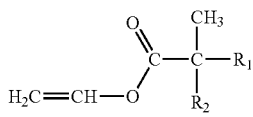

wherein $R_1$ and $R_2$ are alkyl groups collectively having between 3-14 carbon atoms,
wherein said copolymer is neutralized with base at least to the point where it is water soluble,
and wherein the binder composition has a characteristic wet strength of at leastabout 75 gf/in in an aqueous solution of 10 wt. % NaCl, and a characteristic wet strength of less than 50 gf/in in deionized water.

19. The disposable article according to claim 18, wherein said binder composition has a characteristic wet strength of at least about 100 g/in in an aqueous solution of 10 wt. % NaCl.

20. The disposable article according to claim 18, wherein said binder composition has a characteristic wet strength of less than 40 gf/in in deionized water.

21. The disposable article according to claim 18, wherein the copolymer comprises from about 5 to about 15 wt. carboxylic acid units.

22. The disposable article according to claim 18, wherein the copolymer comprises about 10 wt. % carboxylic acid units.

23. The disposable article according to claim 18, wherein the carboxylic acid is crotonic acid.

24. The disposable article according to claim 18, wherein either or both of $R_1$ and $R_2$ are branched alkyl groups.

25. The disposable article according to claim 18, wherein the binder composition further includes an additive selected from the group consisting of: plasticizers, tackifiers, thickeners, fillers, humectants, surfactants, fragrances, pigments, titanium dioxide, colorants, antifoams, bactericides, and bacteriostats.

26. The disposable article according to claim 18, wherein the binder composition comprises from about 50 to about 100 weight percent of said copolymer.

27. The disposable article according to claim 18, wherein the fibrous web is in contact with an inorganic salt.

28. The disposable article according to claim 18, wherein the disposable article is in contact with a solution containing at least about 0.5 wt. % of inorganic salt.

29. The disposable article according to claim 18, wherein the fibrous web further comprises a lotion.

30. The disposable article according to claim 29, wherein the lotion comprises at least 0.5 percent by weight of an inorganic salt.

31. The disposable article according to claim 18, wherein the fibrous web has an add-on value of from about 5 to about 30%.

32. The disposable article according to claim 18, wherein the fibrous web has an add-on value of from about 10 to about 20%.

33. The disposable article according to claim 18, wherein the fibrous web comprises a non-woven web.

34. The disposable article according to claim 33, wherein the fibrous web comprises an air-laid non-woven web.

35. The disposable article according to claim 33, wherein the fibrous web comprises a wet-laid non-woven web.

36. The disposable article according to claim 18, wherein the fibrous web comprises cellulosic fiber.

37. The disposable article according to claim 36 wherein the cellulosic fiber is kraft fiber.

38. The disposable article according to claim 18, wherein the fibrous web comprises synthetic fibers.

39. The disposable article according to claim 38, wherein the synthetic fibers are selected from the group consisting of fibers made from polyester, polypropylene, and rayon.

40. The disposable article according to claim 18, wherein said article is selected from the group consisting of a wet wipe, a diaper, an incontinent garment, and a feminine care product.

* * * * *